April 9, 1968  H. C. KNIGHTS  3,377,252
NUCLEAR REACTORS

Filed July 28, 1966  3 Sheets-Sheet 1

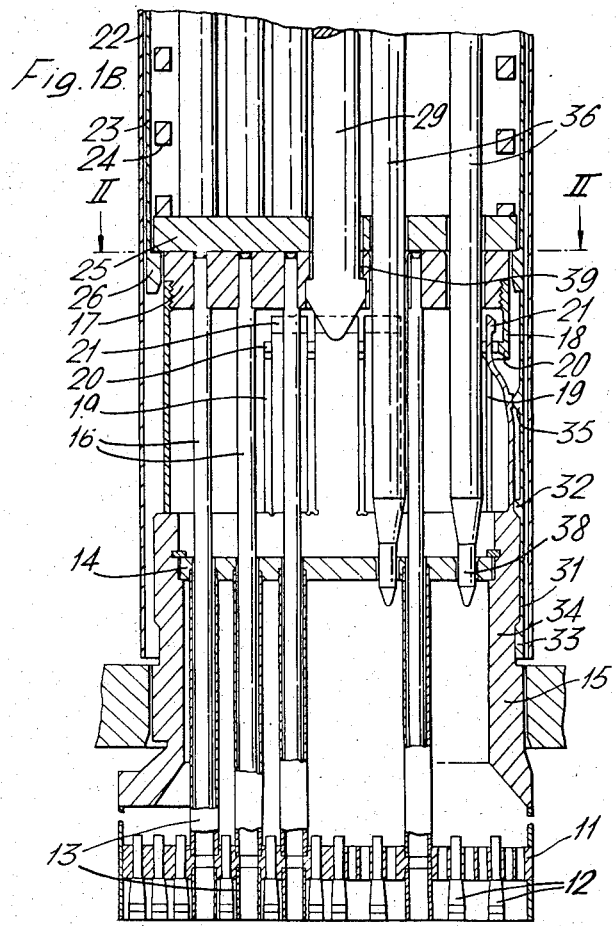

April 9, 1968  H. C. KNIGHTS  3,377,252
NUCLEAR REACTORS

Filed July 28, 1966  3 Sheets-Sheet 3

United States Patent Office 3,377,252
Patented Apr. 9, 1968

3,377,252
NUCLEAR REACTORS
Herbert Chilvers Knights, Culcheth, Warrington, England, assignor to United Kingdom Atomic Energy Authority, London, England
Filed July 28, 1966, Ser. No. 568,422
Claims priority, application Great Britain, Aug. 17, 1965, 35,299/65
8 Claims. (Cl. 176—36)

ABSTRACT OF THE DISCLOSURE

A nuclear reactor core comprises plural individual core units, each core unit including both fuel and a movable reactivity controlling assembly. There is an operating assembly for each controlling assembly, each controlling assembly having attachment means for engagement by the operating assembly. Each core unit includes within the unit lock means for holding its controlling assembly during transport and handling against movement away from an initial low reactivity position. Cooperating means on the lock means and the associated operating assembly release the lock means as the operating assembly engages the attachment means of the controlling assembly. Only on assembly into an operational core is there a freeing of the lock to enable achieving a critical state in the core.

---

Figure 1A:
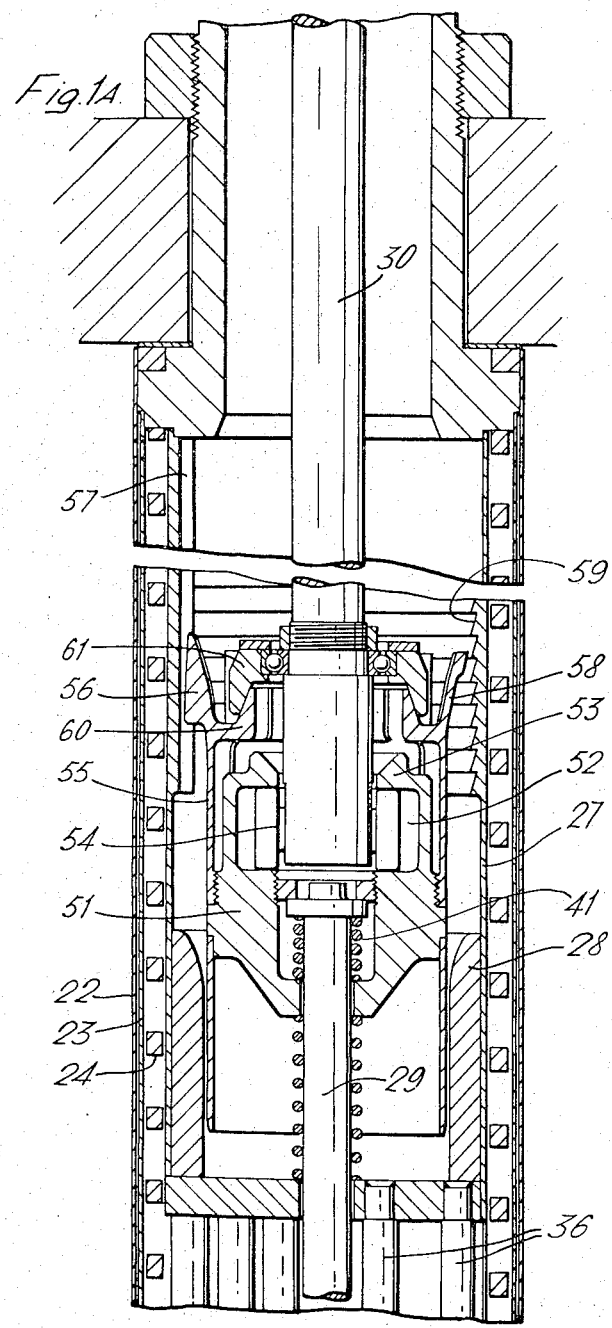

The present invention relates to nuclear reactors and is more particularly concerned with the kind of such reactor in which the core is at least largely composed of many similar units or modules. Typically such a unit is a fuel element assembly of which the components may be an open-ended casing (often referred to as a "shroud" or "wrapper") in which rods of sheathed fuel are carried and spaced apart in parallel-clustered array by grid structures. In a reactor which, for example, uses water for cooling the core, such fuel assemblies commonly have shapes which pack closely, a square shape being usual, so that the assemblies can be juxtaposed to form the core. For the core to be operational other items are necessary, such as reactivity controlling means and a drive mechanism therefor.

According to the present invention, the components of a nuclear reactor core unit, some of which contain fuel, are movable relatively to a low reactivity position in which they are retainable by a lock which is freed automatically when, and so long as, the unit is interengaged with associated structure necessary to form an operational core. By the term "low reactivity position," is to be understood herein a positional relationship of the components which, if the unit were in service in the core, would result in the unit's reactivity being reduced below its potential.

The value of the invention lies in improving the safeness of reactor core units in the course of handling, storage and conveyance outside the reactor core; only on assembly into an operational core is there a freeing of the lock to enable a readjustment of the unit components for achieving a critical state in the core.

The freeing of the lock may result from interengagement with adjacent units. Preferably, however, the freeing is arranged to be effected by items which are introduced at a later stage in the assembly procedure. With a unit which includes a reactivity controlling assembly containing neutron absorber material, the attachment of an operating assembly to the controlling assembly may be utilised for freeing the lock which, in this case, would be effective to maintain the absorber components fully inserted among the fuel components.

Thus, a feature of the invention is the provision of a nuclear reactor core unit in which a reactivity controlling assembly containing neutron absorber material is retainable fully inserted among fuel components of the unit by a lock which is freed automatically when, and so long as, an operating assembly is attached to the controlling assembly. More specifically there is provided the combination comprising a nuclear reactor core unit including fuel-containing components and also a reactivity controlling assembly containing neutron absorber material insertable among the fuel components, a retainer to lock the controlling assembly in the fully inserted position, and an operating assembly attachable to the controlling assembly and adapted to unlock the retainer on making the attachment. The retainer may be an item which is removable once the lock has been freed; however, to avoid the need for a removal operation, the retainer is preferably embodied in the reactivity controlling assembly.

A convenient form of reactivity controlling assembly is one having the neutron absorber material in a cluster of control elements insertable between fuel elements of a fuel cluster. In this case there may be a common carrier for the control elements and this will be displaced away from the fuel elements by the operating assembly to withdraw the control elements from the fully inserted position in order to increase reactivity. Especially if the control elements are long, the addition of stiffening may be desirable to help prevent bending of these elements when they have been withdrawn. It is therefore a further feature of the operating assembly that it comprises an array of parallel stiffening bars, which bars, on approach of the assembly towards the core unit for attachment to the reactivity controlling assembly, pass through complementarily shaped apertures interspersed in the common carrier between the control elements and are received at their leading ends by individual locating means at the adjacent end of the unit. These stiffening bars can of course only occupy the spaces remaining free between the control elements; to increase the cross sectional area, and hence the stiffening potential, the cross sectional shape of the bars may conform to the outline of these interstitial spaces to some extent and this can lead to a variety of non-circular shapes, for example, shapes with concave faces.

In the accompanying drawings is shown, by way of example, a specific embodiment of the invention designed for a pressurised water reactor.

Figure 2:
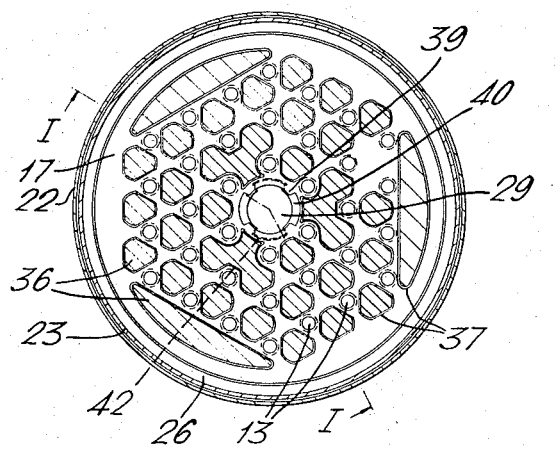

FIGURES 1A and 1B, when placed together end to end, show a longitudinal section substantially on the line I—I of FIGURE 2 of the upper end of a fuel element assembly with a reactivity controlling assembly to which is attached an operating assembly, and FIGURE 2 is a cross section taken on the line II—II of FIGURE 1.

The fuel assembly has an hexagonal casing 11 in which are carried sheathed fuel rods 12. Interspersed among these fuel rods or elements are control pin guide tubes 13 which at their upper ends are located in a top plate 14 secured rigidly within a cylindrical tubular extension 15 of the hexagonal casing 11.

The reactivity controlling assembly is composed of sheathed neutron absorber material in the form of control pins 16 (of diameter similar to that of the fuel rods 12) received in the guide tubes 13, and a common carrier 17 to which the upper ends of the control pins or elements are fixed. The carrier has a skirt 18 in which is embodied a retainer effective to lock the reactivity controlling assembly to the fuel element assembly with the control pins fully inserted. To form this retainer, the skirt 18 has three symmetrically arranged circumferentially extending longitudinal slots 19 each terminating with an inward projection 20. Surmounting the casing extension 15 of the fuel element assembly are three sets of three detent fingers 21 which register with the slots 19 and in the absence of any deflecting force hook securely over the projections 20 to lock the reactivity controlling assembly in the fully inserted position for safe handling of the fuel element assembly. As seen in the drawings, however, the fingers 21 are deflected to free the locks: this results from the attachment of the operating assembly which is now to be described.

The operating assembly comprises a cylindrical tubular housing 22 having a liner 23, a main spring 24, a spring retaining plate 25 seatable on a ledge 26 of the liner 23 to render the main spring captive, an inner support tube 27 embodying a dashpot cylinder 28, and a connecting rod 29 passing through aligned bores of the spring retaining plate 25 and the base of the dashpot cylinder 28 for connecting to the control pin carrier 17. In its upper portion, the operating assembly has a drive spindle 30 coaxially aligned with the connecting rod 29 and extending outside the reactor vessel, in a manner not shown in the drawings, to a drive unit. Such a drive unit may be a type of screw and nut actuator in which a screw driven by, for example, a glandless reluctance motor, engages, preferably through recirculating balls, a nut formed on the drive spindle 30 at its upper end.

Extending beyond the ledge 26, the liner 23 has fingers 31 which correspond to the detent fingers 21 and have projections 32 and 33 arranged to clip into recesses above and below a bulge 34 in the casing extension 15 of the fuel element assembly. A further projection 35 on these fingers is arranged by abutment with the detent fingers 21 of the casing extension to deflect these detent fingers, and hence free the lock previously referred to, when the other projections have clipped into place.

A further set of parts included in the operating assembly is the array of parallel stiffening bars 36: these take various cross-sectional shapes as is apparent in FIGURE 2, and they hang from the base of the dashpot cylinder 28. Complementarily shaped apertures affording slight clearance (as indicated at 37) have to be provided in both the spring retaining plate 25 and the control pin carrier 17 in order that the stiffening bars can reach at their lower ends into the top plate 14 of the fuel element assembly. These lower ends are formed as spikes 38 which can enter bores in the top plate having a lead-in surface on the entry side. On the larger stiffening bars, such as those shaped like a segment of a circle, there may be more than one spike 38.

When the fuel element assembly has been positioned in the reactor core of which it is to form a part, the assembly of the core is continued subsequently by bringing down the operating assembly on to the fuel assembly from the top of the reactor vessel. As the operating assembly approaches closer, the stiffening bars 36 will pass through the control pin carrier 17 and ultimately enter the bores in the top plate 14 of the fuel element assembly, the liner 23 will slip over the casing extension 15 and ultimately unlock the reactivity controlling assembly when the projections 32 and 33 have clipped into place, and the lower end of the connecting rod 29 will enter a socket 39 in the carrier 17. Such entry of the connecting rod requires that it is correctly orientated to enable diametrically opposed wings on the rod to pass through correspondingly shaped cut-outs 40 (FIGURE 2) of the socket 39. Whilst making the attachment of the operating assembly the drive spindle 30 is absent; to establish a connection between the connecting rod and the carrier 17, the former is depressed with the aid of a tool against the action of a spring 41, rotated through 90°, and is then released so that the action of the spring lodges the wings in blind recesses 42, this being the position shown in FIGURE 2.

Thus the reactivity controlling assembly, which previously was locked with the control pins fully inserted, is now freed by attachment of the operating assembly for withdrawal thereby.

For such withdrawal to be effected the drive spindle 30 has to be connected to the connecting rod 29. For this purpose the connecting rod 29 at its upper end is mounted, with limited yield, in a dashpot piston 51 which enters with some small clearance into the dashpot cylinder 28 as the connecting rod 29 approaches the illustrated position corresponding to full insertion of the control pins 16 to the fuel element assembly. The piston 51 is shaped to form one part of a releasable mechanical coupling, this part having a circular socket 52 with overlying flanges 53 defining a diametral slot giving access to the socket. The other part of this coupling is formed on the drive spindle 30 by a hammerhead 54, or in other words, a transverse shaft, which can enter the socket 52 through the diametral slot. Thus, after lowering the spindle 30 for insertion of the hammerhead 54 into the socket 52 by way of the diametral slot, the hammerhead is rotated (by rotation of the spindle 30) through 90° to make the connection of the drive spindle 30 to the connecting rod 29. As illustrated, the engaging surfaces of the hammerhead 54 are provided by rollers to ensure an easy action.

To restrain the dashpot piston 51 against rotation, a cap 55 fixed by a screw thread on the piston has diametrically opposed key fingers 56 which run in keyways 57 formed on the inner surface of the inner support tube 27. This cap 55 is further adopted to form one part of locking means, this part taking the form of detent fingers 58 spaced evenly between the key fingers 56. The other part of this locking means takes the form of ratchet teeth 59 disposed on the inner surface of the inner support tube 27 to face the detent fingers 58.

The key and detent fingers have inwardly projecting lips to form a split collet 60 with which co-operates a compression ring 61 carried by the drive spindle 30. The position of the ring 61 on the drive spindle is such that when the connection of the drive spindle 30 to the connecting rod 29 is made the ring 61 is pressed over the collet 60 and by a wedging action contracts the collet and so retracts the key and detent fingers inwardly. This retraction is insufficient to draw the key fingers 56 out of the keyways 57 but is sufficient to clear the detent fingers 58 from the ratchet teeth 59, or in other words, to cause them to assume a non-engageable condition. Therefore, with the drive spindle 30 connected, the reactivity controlling element assembly can be adjusted over the full range of movement between the fully inserted and fully withdrawn positions without hindrance from the locking means.

Withdrawal of the pins 16 from the fuel element assembly is against the action of the main spring 24. This main spring is provided to re-insert the control pins 16 rapidly for an emergency shut down of the reactor, and for this to happen the connection between the drive spindle 30 and connecting rod 29 is severed. The severance is effected by rotation of the spindle 30 and hence the hammerhead 54 through 90° (in the opposite sense to that used for connecting them), and assuming that the spindle 30 has been raised to withdraw the control pins 16 at least partially from the fuel element assembly, the severance of the connection frees the reactivity controlling element assembly, together with the connecting rod, for rapid re-insertion under the combined bias of the compressed main spring 24 and gravity. Now, on such severing of the connection, the locking means becomes operable, and the collet 60 is freed from the compression ring 61, the detent fingers 58 spring outwards to assume the engageable condition, and as the reactivity controlling assembly is rapidly re-inserted these fingers ride over the ratchet teeth 59 until, when the assembly comes to a standstill, they lock under the ratchet teeth to hold the reactivity controlling assembly positively in its final fully inserted position.

I claim:

1. In a nuclear reactor in which the core comprises plural individual core units, each core unit including both fuel and a movable reactivity controlling assembly, and in which there is an operating assembly for each said controlling assembly, the movable reactivity controlling assembly of at least one of said units having attachment means for engagement by the associated operating assembly, the improvement comprising, lock means within said unit for holding said controlling assembly of said unit during transport and handling against movement away from an initial low reactivity position, and abutment means on said lock means cooperating with means on said operating assembly for automatically releasing said lock means upon engagement of said operating assembly with said attachment means.

2. A unit as claimed in claim 1, wherein the reactivity controlling assembly contains neutron absorbing material and is fully inserted between the fuel components in the low reactivity position.

3. A unit as claimed in claim 2, wherein the lock means comprises a retainer to retain said reactivity controlling assembly in the fully inserted position.

4. A unit as claimed in claim 3, wherein the retainer is embodied in the reactivity controlling assembly.

5. A unit as claimed in claim 2, wherein the reactivity controlling assembly has the neutron absorber material in a cluster of control elements which are insertable between fuel elements of a fuel cluster.

6. A unit as claimed in claim 5, wherein the control elements have a common carrier.

7. A unit as claimed in claim 6, wherein the operating assembly comprises an array of bars which, on approach of the assembly towards the core unit for attachment to the reactivity controlling assembly, are arranged to pass through complementarily shaped apertures interspersed in the common carrier between the control elements to be received at their leading ends by individual locating means at the adjacent end of the unit.

8. Apparatus according to claim 1, wherein the lock means comprise a number of resilient fingers biassed outwardly and internal projections on the controlling assembly on which the fingers engage, wherein the operating assembly has a like number of resilient fingers biassed inwardly and positioned to slide over the fingers on the lock means, and the unit has recesses into which the operating assembly fingers engage to attach the assemblies together, and wherein the abutment means on the lock means fingers are actuated by the operating assembly fingers to disengage the lock means fingers from the projections.

References Cited

UNITED STATES PATENTS

| | | | |
|---|---|---|---|
| 3,120,480 | 2/1964 | Ledin | 176—36 |
| 3,121,045 | 2/1964 | Harris et al. | 176—36 |
| 3,124,513 | 3/1964 | Hawke et al. | 176—36 |
| 3,158,545 | 11/1964 | Jones | 176—36 |
| 3,162,796 | 12/1964 | Schreiber et al. | 176—36 |
| 3,271,264 | 9/1966 | Fortescue et al. | 176—36 |

OTHER REFERENCES

Power Reactor Technology, vol. 8, No. 2, July 1965, pp. 145–147.

CARL D. QUARFORTH, *Primary Examiner.*

L. DEWAYNE RUTLEDGE, *Examiner.*

H. E. BEHREND, *Assistant Examiner.*